United States Patent
Hashimoto et al.

(10) Patent No.: US 8,310,844 B2
(45) Date of Patent: Nov. 13, 2012

(54) ELECTRONIC APPARATUS

(75) Inventors: Seiji Hashimoto, Ome (JP); Motoki Tomita, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/150,638

(22) Filed: Jun. 1, 2011

(65) Prior Publication Data

US 2011/0310540 A1    Dec. 22, 2011

(30) Foreign Application Priority Data

Jun. 18, 2010    (JP) .................. 2010-139795

(51) Int. Cl.
*H02B 1/20*    (2006.01)

(52) U.S. Cl. .................. 361/826; 361/755; 361/825

(58) Field of Classification Search .................. 361/825, 361/826, 755; 455/575.1, 575.2, 575.4; 310/40 R
See application file for complete search history.

(56) References Cited

U.S. PATENT DOCUMENTS

| | | | | |
|---|---|---|---|---|
| 4,781,422 | A | * | 11/1988 | Kimble ............... 361/679.09 |
| 4,878,293 | A | * | 11/1989 | Kinser et al. ................ 29/850 |
| 5,043,846 | A | | 8/1991 | Kinoshita |
| 5,572,769 | A | * | 11/1996 | Spechts et al. ............... 16/337 |
| 6,154,359 | A | * | 11/2000 | Kamikakai et al. ....... 361/679.27 |
| 6,262,824 | B1 | * | 7/2001 | Sasaki et al. .................. 398/115 |
| 7,515,707 | B2 | | 4/2009 | Ka et al. |
| 7,667,959 | B2 | * | 2/2010 | Pelkonen ................. 361/679.27 |
| 2005/0236869 | A1 | | 10/2005 | Ka et al. |

FOREIGN PATENT DOCUMENTS

| | | |
|---|---|---|
| JP | H3-33457 U | 4/1991 |
| JP | H08-6672 | 1/1996 |
| JP | 2001-111249 | 4/2001 |
| JP | 2001-242953 A | 9/2001 |
| JP | 2002-006987 | 1/2002 |
| JP | 2005-030542 A | 2/2005 |
| JP | 2005-184478 | 7/2005 |
| JP | 2005-299924 | 10/2005 |
| JP | 2005-308926 A | 11/2005 |
| JP | 2007-251512 A | 9/2007 |
| JP | 2008-144962 A | 6/2008 |
| JP | 2010-078112 A | 4/2010 |

OTHER PUBLICATIONS

Notice of Reasons for Rejection mailed by the Japan Patent Office on Aug. 30, 2011 in corresponding Japanese Patent Application No. 2010-139795 in 5 pages.

Notice of Reasons for Rejection mailed by the Japan Patent Office on Jan. 10, 2012 in corresponding Japanese Patent Application No. 2010-139795 in 7 pages.

* cited by examiner

*Primary Examiner* — Hung S Bui

(74) *Attorney, Agent, or Firm* — Knobbe Martens Olson & Bear LLP

(57) ABSTRACT

According to one embodiment, an electronic apparatus includes a first housing, a second housing, a third housing between the first housing and the second housing, a holder, and a harness. The third housing is rotatable with respect to the first housing and the second housing. The holder is attached to the third housing and includes a first cylinder inserted into the first housing and a second cylinder inserted into the second housing. The harness extends from the first housing to the second housing through the first cylinder and the second cylinder of the holder.

9 Claims, 7 Drawing Sheets

ELECTRONIC APPARATUS

CROSS-REFERENCE TO RELATED APPLICATIONS

This application is based upon and claims the benefit of priority from Japanese Patent Application No. 2010-139795, filed Jun. 18, 2010; the entire contents of which are incorporated herein by reference.

FIELD

Embodiments described herein relate generally to an electronic apparatus including a harness.

BACKGROUND

An electronic apparatus may include a connection portion that rotatably connects a display unit to a main unit. A harness extends from the display unit toward the main unit through the connection portion.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus comprises a first housing, a second housing, a third housing between the first housing and the second housing, a holder, and a harness. The third housing is rotatable with respect to the first housing and the second housing. The holder is attached to the third housing and comprises a first cylinder inserted into the first housing and a second cylinder inserted into the second housing. The harness extends from the first housing to the second housing through the first cylinder and the second cylinder of the holder.

An embodiment will be described below with reference to the drawings.

FIGS. 1 to 9 disclose an electronic apparatus 1 according to one embodiment. The electronic apparatus 1 is, for example, a notebook personal computer (hereinafter, referred to as a notebook PC). Furthermore, the electronic apparatus 1 is relatively small and is of a hand-held type that can be used while being held in a hand, for example.

Electronic apparatuses to which the present embodiment can be applied are not limited to the above type. The present embodiment is applicable to various electronic apparatuses including, for example, a relatively large notebook PC, personal digital assistant (PDA), game machine, and other electronic terminals.

Figure 1:
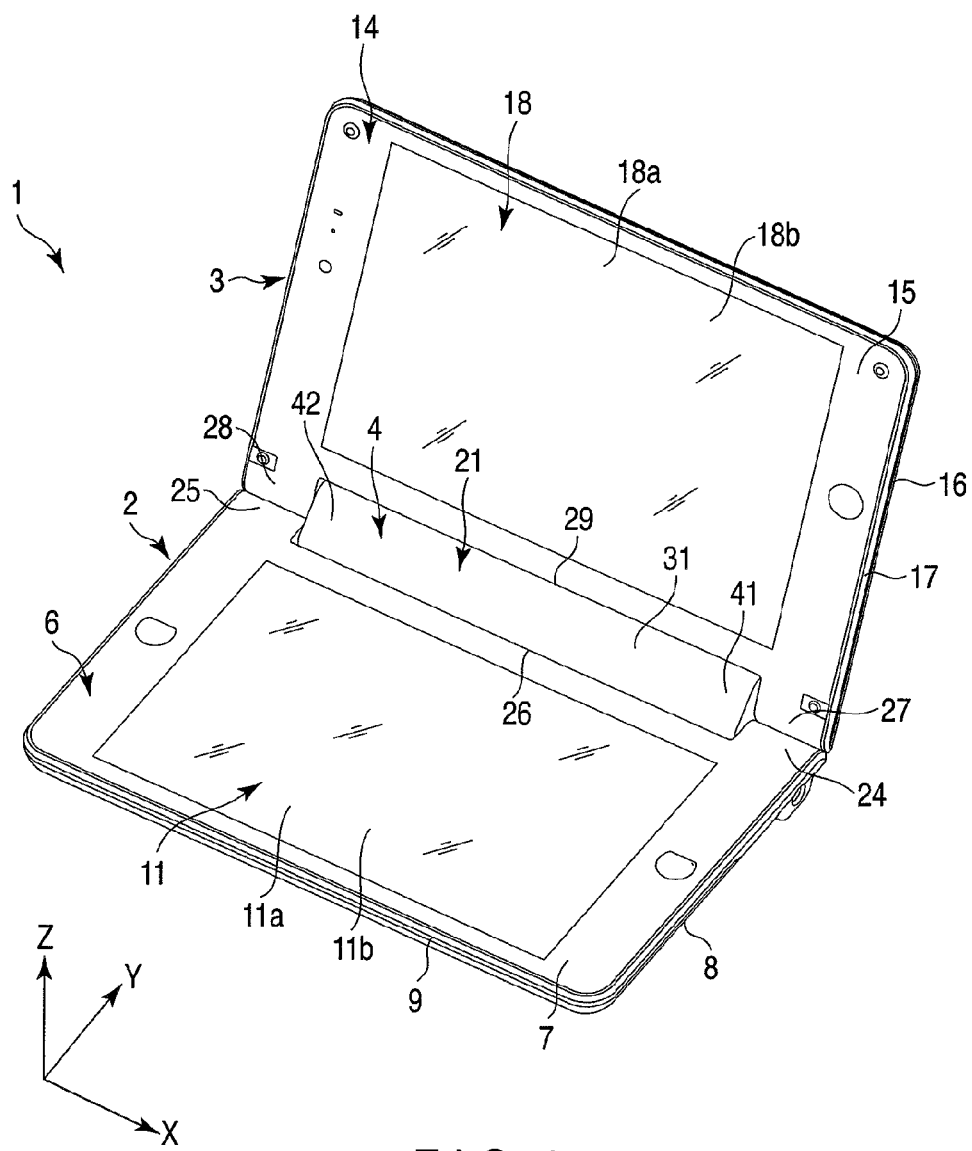
FIG. 1 is an exemplary perspective view showing an example of an electronic apparatus according to a first embodiment.

As shown in FIG. 1, the electronic apparatus 1 includes a first main unit 2, a second main unit 3, and a connection portion 4. In the present embodiment, the first main unit 2 and the second main unit 3 are each a display unit including a display panel. The connection portion 4 rotatably connects the first main unit 2 and the second main unit 3 to each other.

The first main unit 2 includes a first housing 6. The first housing 6 includes a first front wall 7, a first rear wall 8, and a first peripheral wall 9 and has a flat box shape. When the electronic apparatus 1 is placed on a desk, the first rear wall 8 faces the desk surface. The first rear wall 8 is substantially parallel to the desk surface.

The first front wall 7 is on the opposite side of the first rear wall 8 in the first housing 6. The first front wall 7 expands substantially in parallel with the first rear wall 8 with a space therebetween. The first peripheral wall 9 rises with respect to the first front wall 7 and the first rear wall 8 to connect an edge portion of the first front wall 7 and an edge portion of the first rear wall 8.

As shown in FIG. 1, the first housing 6 contains a first display panel 11. The first display panel 11 is, for example, a liquid crystal display (LCD) panel. However, the first display panel 11 is not limited to the above example and may be a plasma display panel, organic EL display panel, or any other type of display panel.

Figure 2:
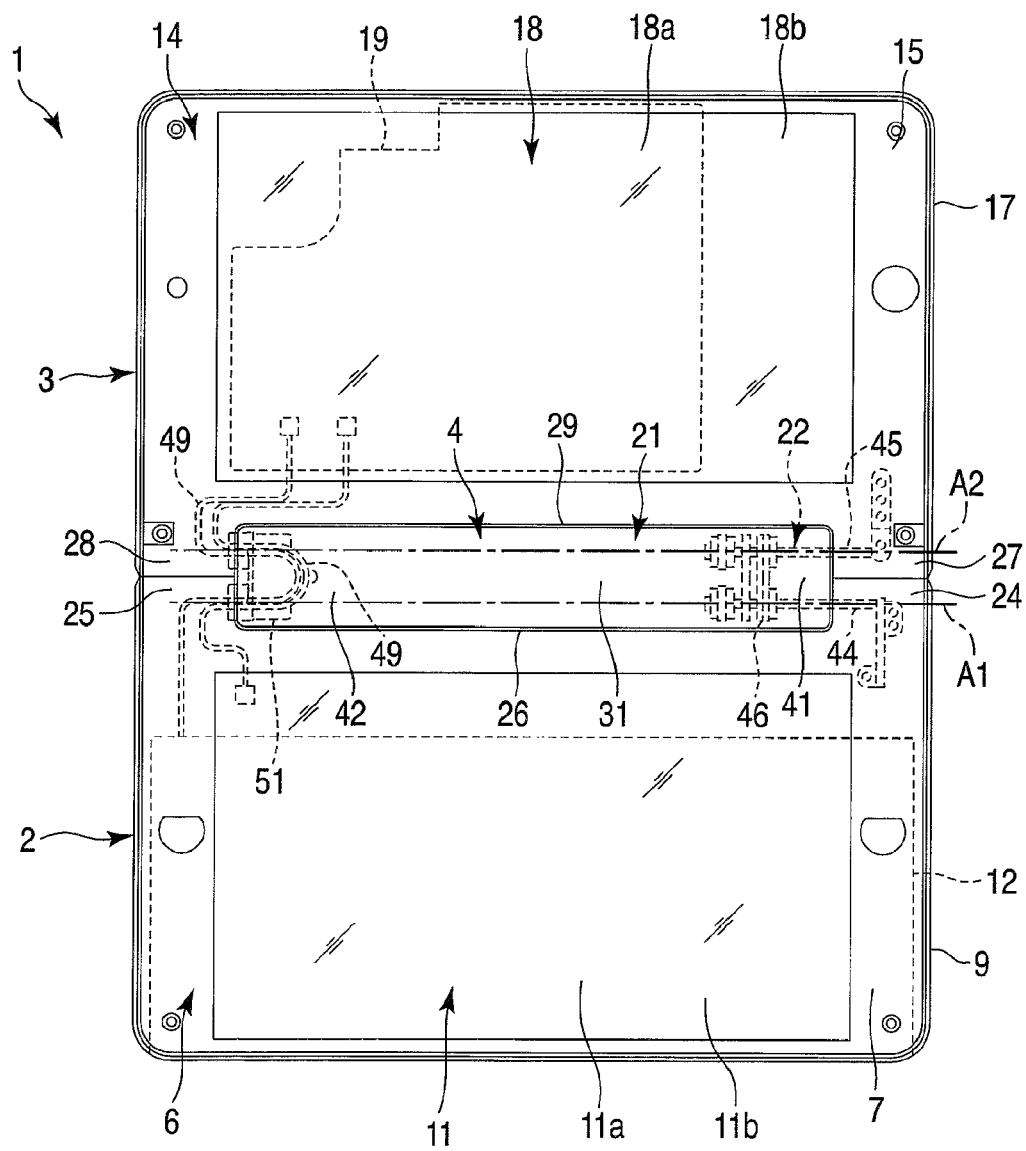
FIG. 2 is an exemplary plan view of the electronic apparatus shown in FIG. 1.

The first display panel 11 includes a display screen 11a to display video or images. The first display panel 11 is provided with a touch panel 11b. A user can input via the touch panel 11b. The electronic apparatus 1 may include a mechanical keyboard instead of the first display panel 11. As shown in FIG. 2, the first housing 6 includes a battery 12 removably attached to the first housing 6.

As shown in FIG. 1, the second main unit 3 includes a second housing 14. The second housing 14 includes a second front wall 15, a second rear wall 16, and a second peripheral wall 17 and has a flat box shape. When the second housing 14 is folded onto the first housing 6, the second front wall 15 faces the first front wall 7 of the first housing 6.

The second rear wall 16 is on the opposite side of the second front wall 15 in the second housing 14. The second rear wall 16 expands substantially in parallel with the second front wall 15 with a space therebetween. The second peripheral wall 17 rises with respect to the second front wall 15 and the second rear wall 16 to connect an edge portion of the second front wall 15 and an edge portion of the second rear wall 16.

As shown in FIG. 1, the second housing 14 contains a second display panel 18. The second display panel 18 is, for example, a liquid crystal display (LCD) panel. However, the second display panel 18 is not limited to the above example and may be a plasma display panel, organic EL display panel, or any other type of display panel.

The second display panel 18 includes a display screen 18a to display video or images. The second display panel 18 is provided with a touch panel 18b. The user can input via the touch panel 18b. It is not always necessary for both the first display panel 11 and the second display panel 18 to include the touch panel, and only one of them may include the touch panel. Alternatively, neither the first display panel 11 nor the second display panel 18 may include the touch panel. As shown in FIG. 2, the second housing 14 contains a circuit board 19, which is a main board.

As shown in FIG. 2, the connection portion 4 includes a third housing 21 and a two-axis hinge mechanism 22 attached to the third housing 21. The third housing 21 is an intermediate piece between the first housing 6 and the second housing 14 and a hinge case accommodating a hinge. The third housing 21 is made of plastic (for example, polycarbonate).

The third housing 21 is rotatably connected to each of the first housing 6 and the second housing 14. The third housing 21 acts as a wedge so that the second housing 14 can be rotatable, for example, substantially between 0 and 180 degrees with respect to the first housing 6.

More specifically, as shown in FIG. 2, the first housing 6 includes a first protrusion 24 and a second protrusion 25. Here, the X direction, Y direction, and Z direction will be defined. As shown in FIG. 1, the X direction and Y direction are directions extending along the first front wall 7 of the first housing 6. The X direction is a longitudinal direction of the first housing 6. The Y direction is a short-side direction of the first housing 6 and is substantially perpendicular to the X direction. The Z direction is a thickness direction of the first housing 6 and is substantially perpendicular to the X direction and the Y direction.

As shown in FIG. 2, the first protrusion 24 and the second protrusion 25 are separately in the longitudinal direction of the first housing 6. The first protrusion 24 and the second protrusion 25 each protrude in the short-side direction of the first housing 6. In other words, the first housing 6 includes a first recess portion 26 between the first protrusion 24 and the second protrusion 25.

Similarly, the second housing 14 includes a third protrusion 27 and a fourth protrusion 28. The third protrusion 27 and the fourth protrusion 28 are separately in the longitudinal direction of the second housing 14. The third protrusion 27 and the fourth protrusion 28 each protrude in the short-side direction of the second housing 14. In other words, the second housing 14 includes a second recess portion 29 between the third protrusion 27 and the fourth protrusion 28.

As shown in FIG. 2, the first protrusion 24 of the first housing 6 and the third protrusion 27 of the second housing 14 face each other. The second protrusion 25 of the first housing 6 and the fourth protrusion 28 of the second housing 14 face each other. The first recess portion 26 of the first housing 6 and the second recess portion 29 of the second housing 14 face each other.

As shown in FIG. 2, the third housing 21 has a slender shape extending in the longitudinal direction (X direction) of the first housing 6. The third housing 21 is provided in a space between the first recess portion 26 and the second recess portion 29. That is, the third housing 21 extends between the first protrusion 24 and the second protrusion 25 of the first housing 6 and between the third protrusion 27 and the fourth protrusion 28 of the second housing 14.

Figure 7:
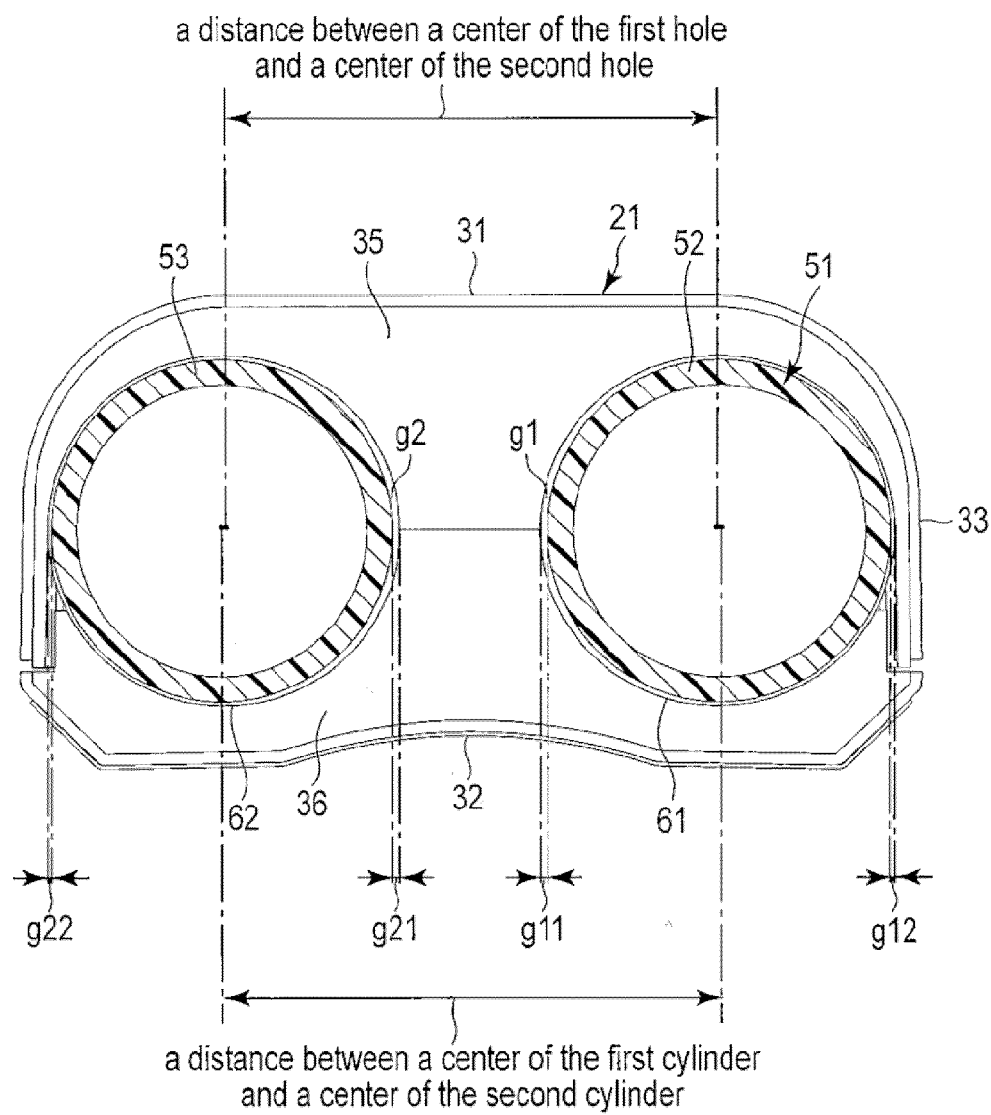
FIG. 7 is an exemplary sectional view along an F7-F7 line schematically showing a relationship between the third housing and the holder shown in FIG. 4.

As shown in FIG. 7, the third housing 21 includes a third front wall 31, a third rear wall 32, and a third peripheral wall 33. The third front wall 31 and the third rear wall 32 rises when the second housing 14 is folded onto the first housing 6.

When the second housing 14 is placed on top of the first housing 6, the third front wall 31 faces the first housing 6 and the second housing 14. The third rear wall 32 is on the opposite side of the third front wall 31 in the third housing 21. When the second housing 14 is folded onto the first housing 6, the third rear wall 32 is directed toward the outer side of the electronic apparatus 1. The third peripheral wall 33 connects an edge portion of the third front wall 31 and an edge portion of the third rear wall 32.

Figure 9:
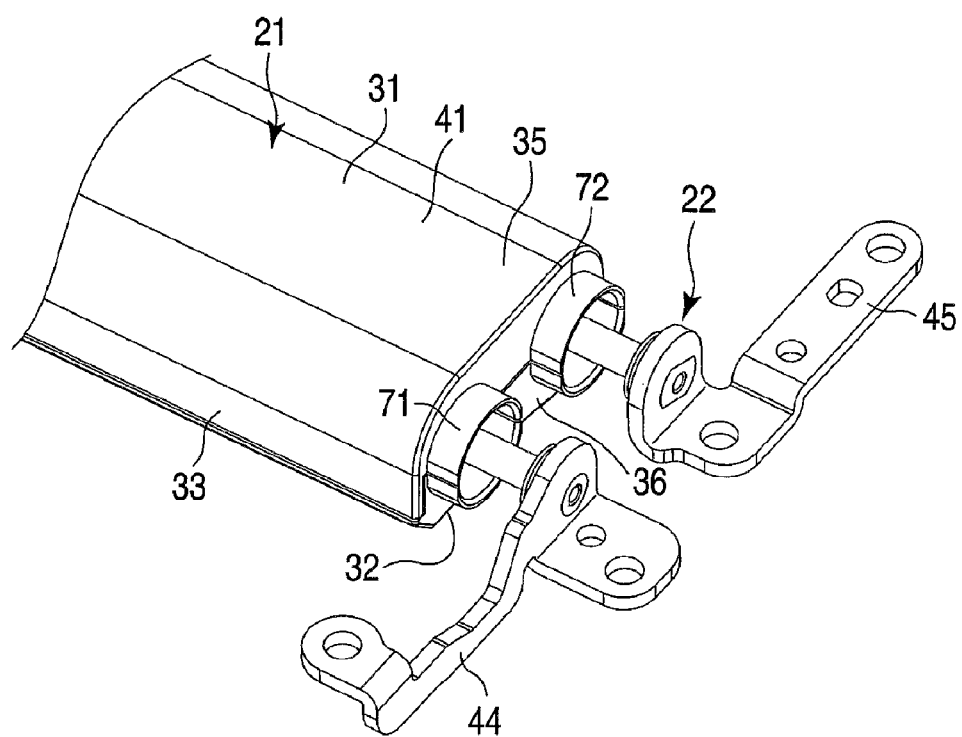
FIG. 9 is an exemplary perspective view showing a first end portion of the third housing shown in FIG. 3.

As shown in FIGS. 7 and 9, the third housing 21 includes a first cover 35 (first member) and a second cover 36 (second member). The first cover 35 includes the third front wall 31 and a part of the third peripheral wall 33. The second cover 36 includes the third rear wall 32 and a part of the third peripheral wall 33. The third housing 21 is formed by the first cover 35 and the second cover 36 being combined.

As shown in FIG. 2, the third housing 21 includes a first end portion 41 and a second end portion 42, which are end portions of the third housing 21 in the longitudinal direction (X direction). The first end portion 41 faces the first protrusion 24 of the first housing 6 and the third protrusion 27 of the second housing 14. The second end portion 42 is on the opposite side of the first end portion 41. The second end portion 42 faces the second protrusion 25 of the first housing 6 and the fourth protrusion 28 of the second housing 14.

As shown in FIG. 2, the two-axis hinge mechanism 22 is attached to the first end portion 41 of the third housing 21. The two-axis hinge mechanism 22 is a so-called cantilever hinge and rotatably connects the third protrusion 27 of the second housing 14 to the first protrusion 24 of the first housing 6. The two-axis hinge mechanism 22 has torque capable of holding the second housing 14 in any posture. On the other hand, no hinge mechanism having torque is provided on the left end portion (that is, the second protrusion 25 and the fourth protrusion 28) of the electronic apparatus 1.

As shown in FIG. 2, the two-axis hinge mechanism 22 includes a first hinge 44 and a second hinge 45 arranged substantially in parallel with each other. The first hinge 44 extends from the third housing 21 into the first protrusion 24 of the first housing 6 to be connected to the first protrusion 24. The first hinge 44 rotatably connects the third housing 21 to the first housing 6.

The second hinge 45 extends from the third housing 21 into the third protrusion 27 of the second housing 14 to be connected to the third protrusion 27. The second hinge 45 rotatably connects the second housing 14 to the third housing 21. Accordingly, the second housing 14 is rotatable with respect to the first housing 6.

Accordingly, the electronic apparatus 1 is changeable from a first posture in which the second housing 14 is folded onto the first housing 6 to a second posture in which the second housing 14 is open at an angle of substantially 180 degrees with respect to the first housing 6. In the second posture, the first housing 6, the second housing 14, and the third housing 21 are arranged substantially flatly. Incidentally, in the electronic apparatus 1, the second housing 14 may be 360 degrees rotatable with respect to the first housing 6.

As shown in FIG. 2, the two-axis hinge mechanism 22 includes a link mechanism 46 that mutually links rotation of the first hinge 44 and the second hinge 45. The link mechanism 46 maintains the rotation angle of the third housing 21 with respect to the first housing 6 and the rotation angle of the second housing 14 with respect to the third housing 21 substantially equal. Thus, when the second housing 14 is raised with respect to the first housing 6, the third housing 21 is raised with respect to the first housing 6 and also the third housing 21 is raised with respect to the second housing 14.

On the other hand, as shown in FIG. 2, the electronic apparatus 1 includes a plurality of harnesses 49 that electrically connect the first main unit 2 and the second main unit 3. These harnesses 49 include, for example, a harness connecting the battery 12 of the first housing 6 to the circuit board 19 of the second housing 14 and a harness connecting the display panel 11 of the first housing 6 to the circuit board 19 of the second housing 14. The "harness" in the present embodiment is not limited to such harnesses. The harness 49 is a collection of a plurality of lead wires.

Figure 6:
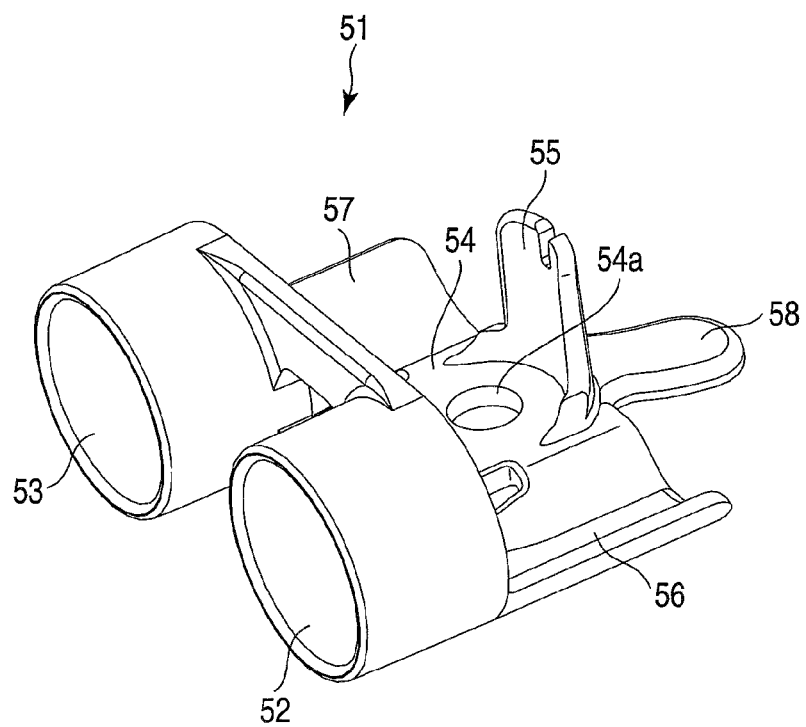
FIG. 6 is an exemplary perspective view of a holder shown in FIG. 5.

As shown in FIG. 2, a holder 51 (harness holder) bundling the harnesses 49 is attached to the second end portion 42 of the third housing 21. As shown in FIG. 6, the holder 51 includes a first cylinder 52, a second cylinder 53, a fixing portion 54, a core 55, a first guiding portion 56, a second guiding portion 57, and a third guiding portion 58.

The first cylinder 52 and the second cylinder 53 each have a through cylindrical shape.

The first cylinder 52 and the second cylinder 53 are arranged substantially in parallel with each other and are oriented and open in the same direction. The first guiding portion 56 is connected to the first cylinder 52. The first guiding portion 56 has a circular-arc shape continuing to a part of the first cylinder 52. The second guiding portion 57 is connected to the second cylinder 53. The second guiding portion 57 has a circular-arc shape continuing to a part of the second cylinder 53.

Figure 3:
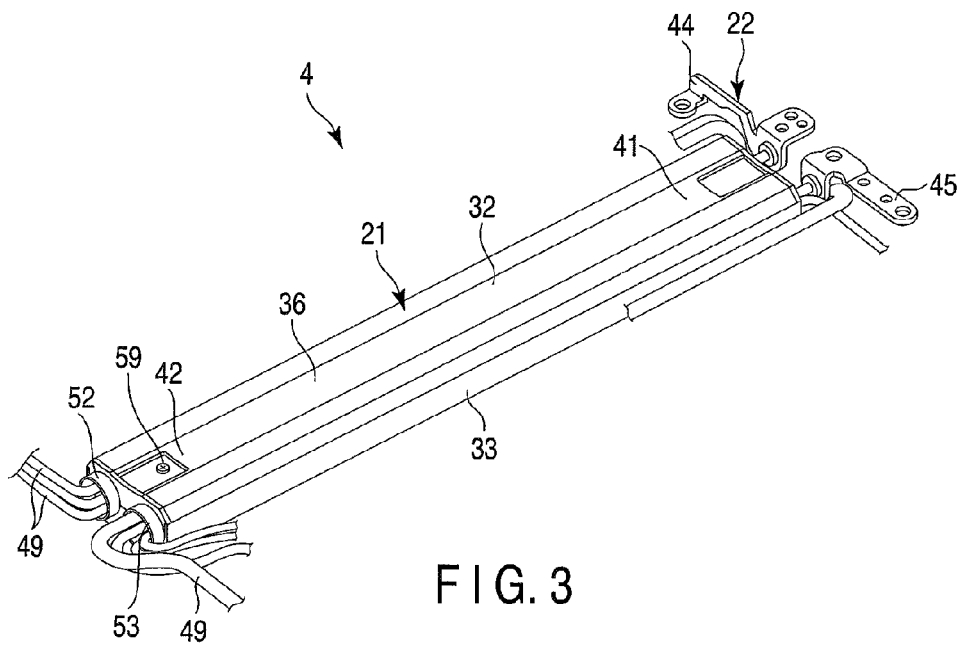
FIG. 3 is an exemplary perspective view showing a third housing shown in FIG. 1.

The fixing portion 54 is between the first guiding portion 56 and the second guiding portion 57. The fixing portion 54 includes a screw insertion hole 54a. As shown in FIG. 3, the first cover 35 and the second cover 36 of the third housing 21 are fixed by a screw 59. With the screw 59 inserted into the screw insertion hole 54a of the fixing portion 54, the holder 51 is fixed to the third housing 21 with the screw 59.

The core 55 rises with respect to the first guiding portion 56 and the second guiding portion 57. The core 55 is oriented in the opposite direction of the first cylinder 52 and the second cylinder 53 and has a convex circular-arc shape. The third guiding portion 58 is at a base end portion of the core 55 and on substantially the same plane as the fixing portion 54. The third guiding portion 58 extends from the core 55 in the opposite direction of the first cylinder 52 and the second cylinder 53.

Figure 5:
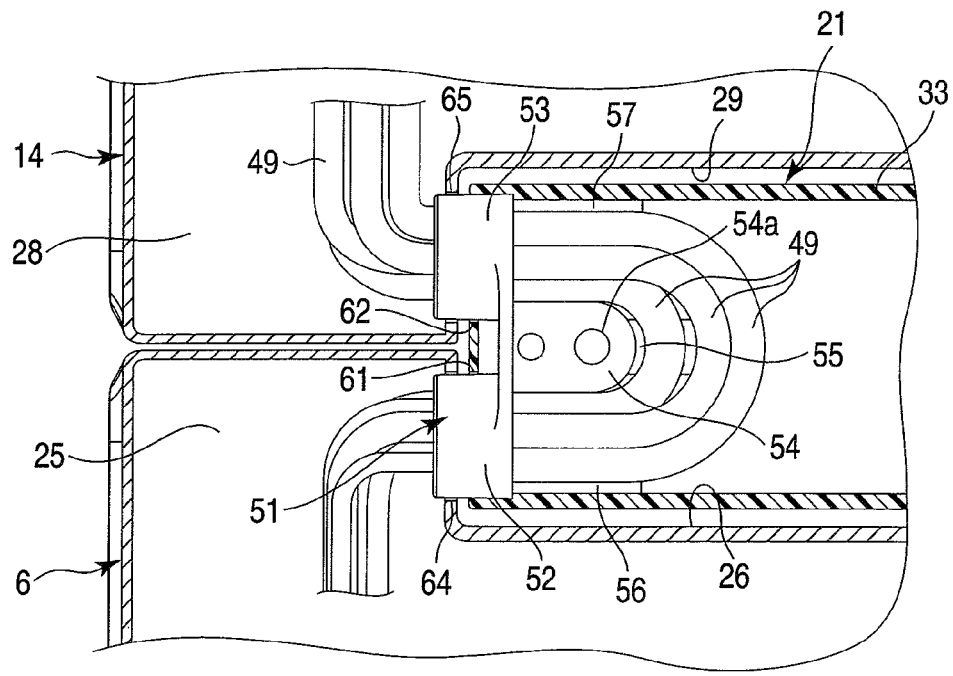
FIG. 5 is an exemplary sectional view showing the inside of the third housing shown in FIG. 3.

As shown in FIGS. 5 and 7, the third housing 21 includes a first hole 61 and a second hole 62. The first hole 61 faces the second protrusion 25 of the first housing 6. The first hole 61 is slightly larger than the first cylinder 52 and the first cylinder 52 is passed therethrough. The second hole 62 faces the fourth protrusion 28 of the second housing 14. The second hole 62 is slightly larger than the second cylinder 53 and the second cylinder 53 is passed therethrough.

Figure 4:
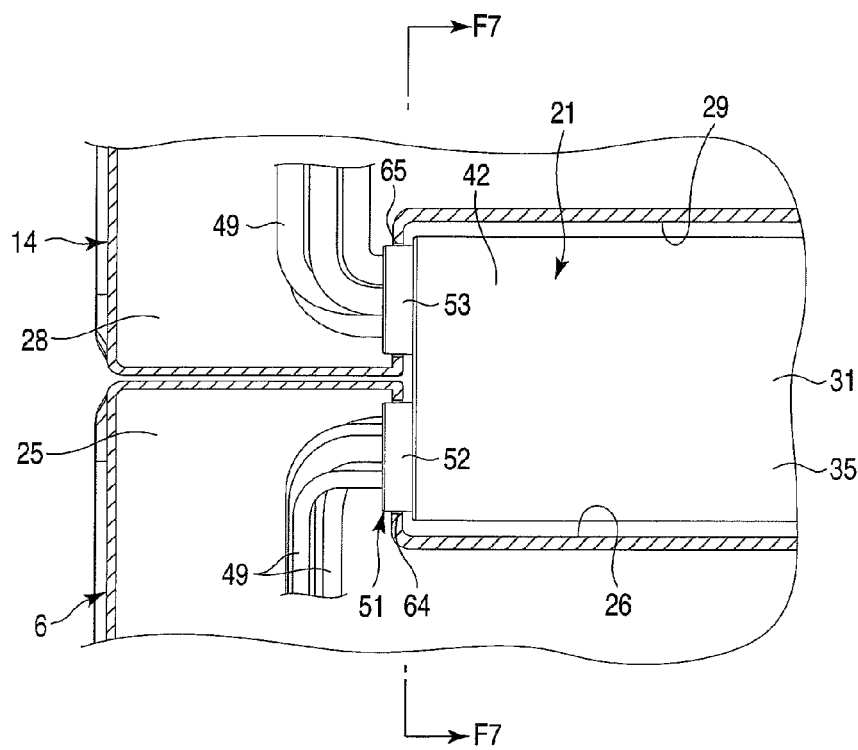
FIG. 4 is an exemplary sectional view showing the periphery of a second end portion of the third housing shown in FIG. 3.

Accordingly, as shown in FIGS. 4 and 5, the first cylinder 52 sticks out of the third housing 21 to project toward the second protrusion 25 of the first housing 6. The second cylinder 53 sticks out of the third housing 21 to project toward the fourth protrusion 28 of the second housing 14.

As shown in FIGS. 4 and 5, the second protrusion 25 includes a first through-hole 64 facing the first hole 61 of the third housing 21. The fourth protrusion 28 includes a second through-hole 65 facing the second hole 62 of the third housing 21. The first through-hole 64 and the second through-hole 65 are each examples of the "hole". The first through-hole 64 and the second through-hole 65 are open in the longitudinal direction (X direction) of the third housing 21.

The end portion of the first cylinder 52 is inserted into the first through-hole 64 to be inserted into the first housing 6. The first through-hole 64 is slightly larger than the outer diameter of the first cylinder 52. The first cylinder 52 is received by an inner circumferential surface of the first through-hole 64 and is rotatable with respect to the first housing 6. That is, the first through-hole 64 is a receiving portion (i.e., bearing) to receive the first cylinder 52 as an axis. The first cylinder 52 rotatably supports the third housing 21 with respect to the first housing 6.

Similarly, the end portion of the second cylinder 53 is inserted into the second through-hole 65 to be inserted into the second housing 14. The second through-hole 65 is slightly larger than the outer diameter of the second cylinder 53. The second cylinder 53 is received by the inner circumferential surface of the second through-hole 65 and is rotatable with respect to the second housing 14. That is, the second through-hole 65 is a receiving portion (i.e., bearing) to receive the second cylinder 53 as an axis. The second cylinder 53 rotatably supports the second housing 14 with respect to the third housing 21.

As shown in FIG. 2, the first cylinder 52 is located on an extension A1 of the axis of the first hinge 44. The second cylinder 53 is located on an extension A2 of the axis of the second hinge 45. In other words, two axes substantially concentric with the first hinge 44 and the second hinge 45 are provided on the second end portion 42 of the third housing 21.

The holder 51 is made, for example, of a material whose rigidity is greater, whose abrasion resistance is higher and whose coefficient of friction is lower than those of the third housing 21. The holder 51 is formed of, for example, a polymeric material. An example of the material for the holder 51 is DURACON SW-01 of POM. However, the material for the holder 51 is not limited to this and may be formed of, for example, a general plastic material that is the same as that of the third housing 21.

As shown in FIG. 2, the plurality of harnesses 49 passes through the third housing 21 between the first housing 6 and the second housing 14. Specifically, as shown in FIG. 5, the plurality of harnesses 49 enters the first cylinder 52 of the holder 51 from the first housing 6 and goes out of the second cylinder 53 to extend toward the second housing 14.

More specifically, the harness 49 entering the first cylinder 52 from the first housing 6 extends up to the core 55 along the first guiding portion 56.

Then, the harness 49 is turned around the core 55 to extend along the second guiding portion 57. The harness 49 extended to the second guiding portion 57 is passed through the second cylinder 53 to extend from the second cylinder 53 to the second housing 14. Thus, the holder 15 supports the harness 49 in a U shape.

Next, the relationship between the holder 51 and the third housing 21 will be described. As shown in FIG. 7, the first cylinder 52 is not concentric with the center of the first hole 61. The first cylinder 52 is decentered in a direction away from the second cylinder 53 with respect to the center of the first hole 61.

In other words, a gap g1 is between the first cylinder 52 and the first hole 61. The gap g1 includes a first gap portion g11 and a second gap portion g12. The first gap portion g11 is between the first cylinder 52 and the second cylinder 53. The second gap portion g12 is on the opposite side of the first gap portion g11. The first gap portion g11 is larger than the second gap portion g12. The second gap portion g12 may be without a substantial gap.

Similarly, the second cylinder 53 is not concentric with the center of the second hole 62. The second cylinder 53 is decentered in a direction away from the first cylinder 52 with respect to the center of the second hole 62. In other words, a gap g2 is between the second cylinder 53 and the second hole 62. The gap g2 includes a third gap portion g21 and a fourth gap portion g22. The third gap portion g21 is between the second cylinder 53 and the first cylinder 52. The fourth gap portion g22 is on the opposite side of the third gap portion g21. The third gap portion g21 is larger than the fourth gap portion g22. The fourth gap portion g22 may be without a substantial gap.

Figure 8:
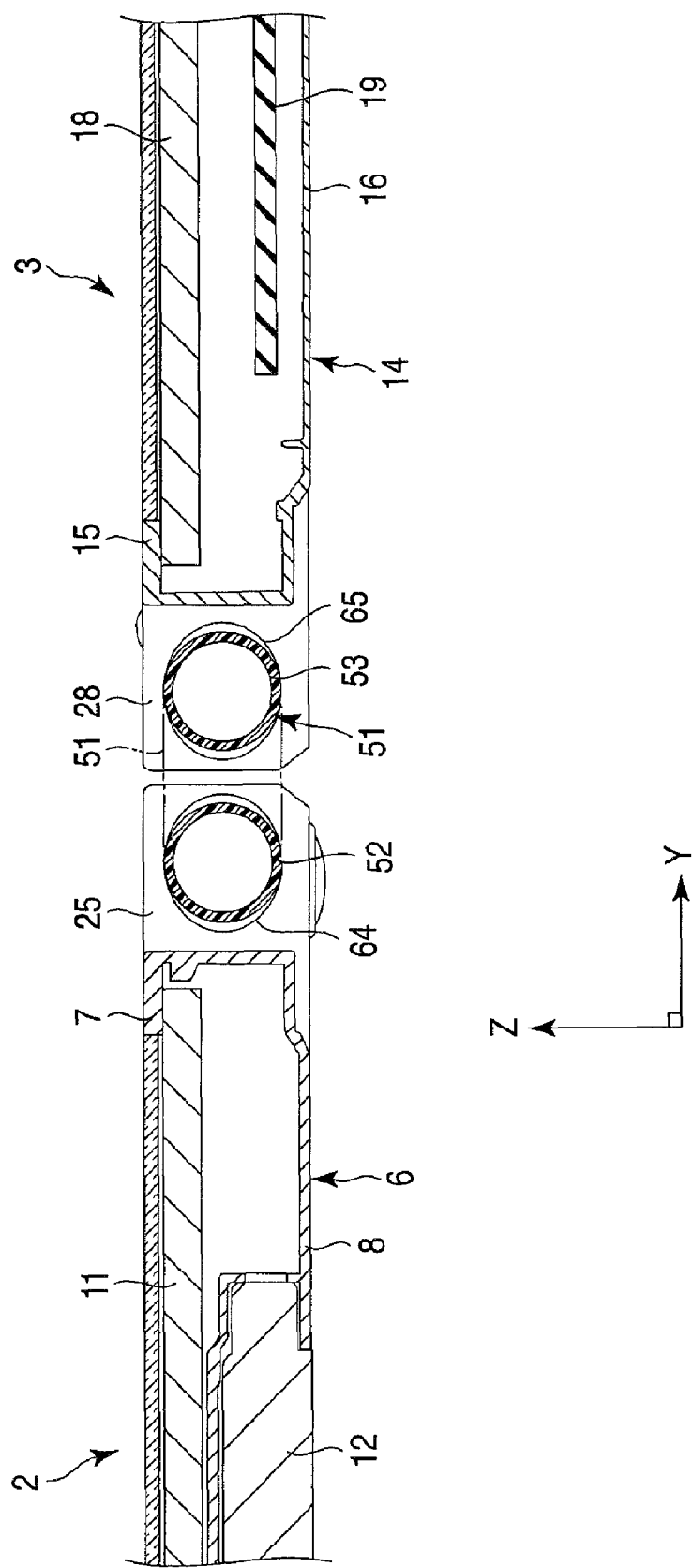
FIG. 8 is an exemplary sectional view schematically showing the relationship among a first housing, a second housing, and the holder shown in FIG. 1.

As shown in FIG. 8, the first through-hole 64 is an elliptic shape having, for example, a longer dimension in the short-side direction of the first housing 6. The second through-hole 65 is an elliptic shape having, for example, a longer dimension in the short-side direction of the second housing 14. Accordingly, the holder 51 is resistant to rattling in the thickness direction of the first housing 6 and in the thickness direction of the second housing 14.

By making the first through-hole 64 and the second through-hole 65 elliptic, a contact area between the first cylinder 52 and the first through-hole 64 and the contact area between the second cylinder 53 and the second through-hole 65 can be made relatively small. Accordingly, frictional resistance of the holder 51 (that is, the third housing 21) to the first housing 6 and the second housing 14 decreases.

As shown in FIG. 9, the first end portion 41 of the third housing 21 includes a third cylinder 71 and a fourth cylinder 72 serving as a blindfold of the first hinge 44 and the second hinge 45. The third cylinder 71 and the fourth cylinder 72 are each divided into an upper half and a lower half by the first cover 35 and the second cover 36 constituting the third housing 21.

Next, the assembly of the electronic apparatus 1 will be described.

The plurality of harnesses 49 is prepared while bundled by being inserted into the holder 51. That is, the harnesses 49 are put into the first cylinder 52 of the holder 51, turned around the core 55 in a U shape, and pulled out of the second cylinder 53. The plurality of harnesses 49 and the holder 51 are integrated like one component to become a harness ASSY component (intermediate assembly component).

The harness 49 is mounted by attaching the holder 51 to the third housing 21. Accordingly, one end portion of the harness 49 is mounted inside the first housing 6 and the other end portion of the harness 49 is mounted inside the second housing 14. Thus, the plurality of harnesses 49 can be mounted at a time only by attaching the holder 51.

According to the electronic apparatus 1 configured as described above, a locally acting load can be reduced. For example, in an electronic apparatus including a link mechanism like a hinge, the load is likely to concentrate on the link mechanism. Thus, if the electronic apparatus is used for a long time, the link mechanism may fail.

On the other hand, the electronic apparatus 1 according to the present embodiment includes the holder 51 on the third housing 21. The holder 51 includes the first cylinder 52 inserted into the first housing 6 and the second cylinder 53 inserted into the second housing 14. With the first cylinder 52 and the second cylinder 53 supporting the first housing 6 and the second housing 14 like, for example, an axis, the load acting on the link mechanism linking the third housing 21 to the first housing 6 and the second housing 14 can be reduced.

In the present embodiment, the holder 51 bundling the harnesses 49 supports the first housing 6 and the second housing 14. Thus, the need to provide a dedicated component to distribute the load acting on the link mechanism is reduced or such a need is eliminated so that the number of components can be reduced.

Further, the harnesses 49 are passed through the cylinders 52 and 53 of the holder 51 supporting the first housing 6 and the second housing 14 and thus, the possibility of the harnesses 49 being caught in a rotating portion of the electronic apparatus 1 is reduced so that the harnesses 49 are protected.

Generally, a load is likely to act on a cantilever hinge. In the present embodiment, the cylinders 52 and 53 of the holder 51 support the first housing 6 and the second housing 14 on the end portion on the opposite side of the cantilever hinge. Accordingly, the load on the cantilever hinge is reduced.

In the present embodiment, the first housing 6 includes the first through-hole 64 receiving the first cylinder 52. The second housing 14 includes the second through-hole 65 receiving the second cylinder 53. Accordingly, the first cylinder 52 and the second cylinder 53 are smoothly received by the first through-hole 64 and the second through-hole 65 serving as bearings respectively and are smoothly rotatable with respect to the first housing 6 and the second housing 14. Thus, the first cylinder 52 and the second cylinder 53 are more ready to take the load so that the load acting on the hinge can be reduced.

In the present embodiment, the first cylinder 52 is located on the extension A1 of the axis of the first hinge 44. The second cylinder 53 is located on the extension A2 of the axis of the second hinge 45. Accordingly, two axes corresponding to the two-axis hinge by the first hinge 44 and the second hinge 45 are formed by the first cylinder 52 and the second cylinder 53. Thus, the first cylinder 52 and the second cylinder 53 are more ready to take the load so that the load acting on the hinge can be reduced.

In the present embodiment, the harnesses 49 are bundled by being passed through the holder 51. The many harnesses 49 can be mounted at a time by attaching the holder 51 to the third housing 21. Accordingly, assembly properties of the electronic apparatus 1 can be improved.

A load acts on the first cylinder 52 and the second cylinder 53 of the holder 51 supporting the first housing 6 and the second housing 14 when the electronic apparatus 1 is opened/closed and thus, the shape thereof may be distorted when the electronic apparatus 1 is used for a long time. More concretely, a load is likely to act on the first cylinder 52 and the second cylinder 53 in a direction in which the first cylinder 52 and the second cylinder 53 are brought closer. This is because when the second main unit 3 is raised with respect to the first main unit 2, the self weight of the second main unit 3 acts in the direction, for example, from the second cylinder 53 toward the first cylinder 52.

Thus, the second cylinder 53 may be deformed by being oriented toward the first cylinder 52. If the second cylinder 53 is deformed, a stress acts between the second cylinder 53 and the third housing 21 so that the third housing 21 may be damaged.

On the other hand, the first cylinder 52 may be deformed by being oriented toward the second cylinder 53. If the first cylinder 52 is deformed, a stress acts between the first cylinder 52 and the third housing 21 so that the third housing 21 may be damaged.

In the present embodiment, however, the second cylinder 53 is not concentric with the center of the second hole 62. The second cylinder 53 is arranged by being decentered in a direction away from the first cylinder 52 in advance with respect to the center of the second hole 62.

Thus, even if the second cylinder 53 is deformed by being oriented toward the first cylinder 52 due to repeated usage thereof, a gap is more likely to be ensured between the second cylinder 53 and the second hole 62 and the second cylinder 53 is less likely to be pressed against the inner circumferential surface of the second hole 62. Therefore, a large stress is less likely to act between the second cylinder 53 and the third housing 21 so that the third housing 21 is less likely to be damaged.

Similarly, the first cylinder 52 is not concentric with the center of the first hole 61. The first cylinder 52 is arranged by being decentered in a direction away from the second cylinder 53 in advance with respect to the center of the first hole 61.

Thus, even if the first cylinder 52 is deformed by being oriented toward the second cylinder 53 due to repeated usage thereof, a gap is more likely to be ensured between the first cylinder 52 and the first hole 61 and the first cylinder 52 is less likely to be pressed against the inner circumferential surface of the first hole 61. Therefore, a large stress is less likely to act between the first cylinder 52 and the third housing 21 so that the third housing 21 is less likely to be damaged.

In the present embodiment, as shown in FIG. 10, the first through-hole 64 is an elliptic shape having a longer dimension in the short-side direction of the first housing 6. Thus, even if the first cylinder 52 is deformed by being oriented toward the second cylinder 53 due to repeated usage thereof, a gap between the first housing 6 and the second housing 14 is more likely to be maintained.

If the first through-hole 64 is completely round corresponding to the first cylinder 52, the gap between the first housing 6 and the second housing 14 becomes narrower when the first cylinder 52 is deformed by being oriented toward the second cylinder 53. Then, the first housing 6 and the second housing 14 may collide with each other. However, in the present embodiment in which the first through-hole 64 is an elliptic shape, the above possibility is small.

Similarly, in the present embodiment, the second through-hole 65 is an elliptic shape having a longer dimension in the short-side direction of the second housing 14. Thus, even if the second cylinder 53 is deformed by being oriented toward the first cylinder 52 due to repeated usage thereof, a gap between the first housing 6 and the second housing 14 is more likely to be maintained and the first housing 6 and the second housing 14 are less likely to collide with each other.

In the present embodiment, the holder 51 is formed of a material whose rigidity is greater than that of the third housing 21. Thus, the first cylinder 52 and the second cylinder 53 are less likely to be deformed as described above. Therefore, damage of the third housing 21 and contact between the first housing 6 and the second housing 14 are less likely to occur.

Embodiment is not limited to the above embodiment as it is and elements can be modified for implementation without departing from the scope thereof in the stage of embodiment. By appropriately combining a plurality of elements disclosed in the above embodiment, various embodiments can be formed. For example, some elements shown in the embodiment may be deleted from all elements. Further, elements from different embodiments may appropriately be combined.

In the above embodiment, other than the first cylinder 52 and the second cylinder 53 of the holder 51, no portion is formed in a duct shape. Instead, the entire or a part of other portions of the holder 51 may be formed in a duct shape. If there are many open portions like the present embodiment, a contact area between the holder 51 and the harnesses 49 becomes smaller and the harnesses 49 are less likely to be damaged. The first cylinder 52 and the second cylinder 53 may not be decentered with respect to the first hole 61 and the second hole 62, respectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first housing;
a second housing;
a third housing comprising a first end portion and a second end portion, the first end portion comprising a first hinge connected to the first housing and a second hinge connected to the second housing, the second end portion opposite to the first end portion and comprising a first hole and a second hole;
a holder attached to the second end portion of the third housing, the holder comprising a first cylinder and a second cylinder, the first cylinder in the first hole and the first housing, the second cylinder in the second hole and the second housing; and
a harness extending from the first housing to the second housing through the first cylinder and the second cylinder of the holder,
wherein a distance between a center of the first hole and a center of the second hole is smaller than a distance between a center of the first cylinder and a center of the second cylinder.

2. The electronic apparatus of claim 1, wherein
the first housing comprises a third hole accommodating the first cylinder and the second housing comprises a fourth hole accommodating the second cylinder.

3. The electronic apparatus of claim 1, wherein
the first cylinder supports the third housing with respect to the first housing and the second cylinder supports the second housing with respect to the third housing.

4. The electronic apparatus of claim 1, wherein
the first cylinder is on an extension of an axis of the first hinge and the second cylinder is on an extension of an axis of the second hinge.

5. The electronic apparatus of claim 1, wherein
the first cylinder is offset from the center of the first hole in a direction away from the second cylinder.

6. The electronic apparatus of claim 1, wherein
the second cylinder is offset from the center of the second hole in a direction away from the first cylinder.

7. The electronic apparatus of claim 1, wherein
the holder comprises a material having a greater rigidity than a material of the third housing.

8. An electronic apparatus comprising:
a first housing;
a second housing;
a third housing, rotatable with respect to the first housing and the second housing, and comprising a first hole facing the first housing and a second hole facing the second housing;
a holder attached to the third housing and comprising a first cylinder and a second cylinder, the first cylinder offset from a center of the first hole in a direction away from the second hole and extending from the first hole into the first housing, the second cylinder offset from a center of the second hole in a direction away from the first hole and extending from the second hole into the second housing; and
a harness extending from the first housing to the second housing through the first cylinder and the second cylinder of the holder.

9. An electronic apparatus comprising:

a first housing;

a second housing;

a third housing between the first housing and the second housing, rotatable with respect to the first housing and the second housing, and comprising a first hole and a second hole;

a holder attached to the third housing and comprising a first cylinder and a second cylinder, the first cylinder in the first hole and the first housing, the second cylinder in the second hole and the second housing; and a harness extending from the first housing to the second housing through the first cylinder and the second cylinder of the holder, wherein a distance between a center of the first hole and a center of the second hole is smaller than a distance between a center of the first cylinder and a center of the second cylinder.

* * * * *